(12) United States Patent
Nakajima et al.

(10) Patent No.: US 11,626,602 B2
(45) Date of Patent: Apr. 11, 2023

(54) WARMING-UP SYSTEM

(71) Applicant: HONDA MOTOR CO., LTD., Tokyo (JP)

(72) Inventors: Nobutaka Nakajima, Saitama (JP); Junya Miyazaki, Saitama (JP); Kento Takeuchi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/684,426

(22) Filed: Mar. 2, 2022

(65) Prior Publication Data

US 2022/0302482 A1    Sep. 22, 2022

(30) Foreign Application Priority Data

Mar. 16, 2021   (JP) ............................. JP2021-042840

(51) Int. Cl.
| | |
|---|---|
| H01M 8/04 | (2016.01) |
| H01M 8/04223 | (2016.01) |
| H01M 8/04007 | (2016.01) |
| H01M 8/04225 | (2016.01) |
| H01M 8/04302 | (2016.01) |
| H01M 8/0432 | (2016.01) |

(52) U.S. Cl.
CPC ..... *H01M 8/04268* (2013.01); *H01M 8/0432* (2013.01); *H01M 8/04067* (2013.01); *H01M 8/04225* (2016.02); *H01M 8/04302* (2016.02); *H01M 2250/20* (2013.01); *H01M 2250/402* (2013.01)

(58) Field of Classification Search
CPC ......... H01M 8/04268; H01M 8/04225; H01M 8/04302; H01M 8/04067; H01M 8/0432; H01M 2250/20; H01M 2250/402

USPC .......................................................... 429/429
See application file for complete search history.

(56) References Cited

U.S. PATENT DOCUMENTS

| | | | |
|---|---|---|---|
| 11,230,288 B1* | 1/2022 | Tokarz ................. | B60W 20/40 |
| 2019/0088962 A1* | 3/2019 | Chikugo ........... | H01M 8/04753 |
| 2020/0094695 A1* | 3/2020 | Bowman .................. | F16D 3/52 |
| 2020/0108686 A1* | 4/2020 | Badger, II ............... | B60L 50/61 |
| 2020/0233410 A1* | 7/2020 | Burns ..................... | B60L 50/66 |

FOREIGN PATENT DOCUMENTS

| | | |
|---|---|---|
| JP | 2011503812 A | 1/2011 |
| WO | 2009062595 A1 | 5/2009 |

* cited by examiner

*Primary Examiner* — James M Erwin
(74) *Attorney, Agent, or Firm* — CKC & Partners Co., LLC

(57) ABSTRACT

To provide a warming-up system in which a period of time taken to warm up a fuel cell is shorter than that for conventional ones. A warming-up system according to an embodiment includes a fuel cell, a motor, a rotation shaft, a speed reducer, a measuring unit, and a control unit. The motor convert electrical power generated by the fuel cell into a rotative force. The speed reducer brake the rotation shaft that is rotating. The measuring unit measure a temperature of the fuel cell. The control unit is configured to determine whether to perform warming up for the fuel cell, based on the temperature. When the control unit determines to perform the warming up, the control unit causes the motor and the speed reducer to operate, and uses heat generated in the fuel cell and heat generated in the speed reducer to warm up the fuel cell.

8 Claims, 5 Drawing Sheets

WARMING-UP SYSTEM

This application is based on and claims the benefit of priority from Japanese Patent Application No. 2021-042840, filed on 16 Mar. 2021, the content of which is incorporated herein by reference.

BACKGROUND OF THE INVENTION

Field of the Invention

The present invention relates to a warming-up system.

Related Art

If the temperature of a fuel cell is excessively low, the efficiency of electrical power generation of the fuel cell may decrease or the fuel cell may be unable to correctly generate electrical power. Therefore, in motor vehicles that are equipped with fuel cells, such as fuel cell vehicles (FCVs), the fuel cells need to be warmed up when the temperature of the fuel cells is low. The longer it takes to warm up the fuel cells, the longer it takes before the vehicle can be started. Therefore, there has been a desire to shorten a period of time taken to warm up the fuel cells.

Patent Document 1: Japanese Unexamined Patent Application (Translation of PCT Application), Publication No. 2011-503812

SUMMARY OF THE INVENTION

An object of an embodiment of the present invention is to provide a warming-up system in which a period of time taken to warm up a fuel cell is shorter than that for conventional ones.

A warming-up system according to an embodiment includes a fuel cell, a motor, a rotation shaft, a speed reducer, a measuring unit, and a control unit. The fuel cell is configured to generate electrical power through electrochemical reactions. The motor is configured to convert the electrical power generated by the fuel cell into a rotative force. The rotation shaft rotates by the rotative force. The speed reducer is configured to brake the rotation shaft that is rotating. The measuring unit is configured to measure a temperature of the fuel cell. The control unit is configured to determine whether to perform warming up for the fuel cell, based on the temperature. When the control unit determines to perform the warming up, the control unit causes the motor and the speed reducer to operate, and uses heat generated in the fuel cell and heat generated in the speed reducer to warm up the fuel cell.

According to the present invention, a period of time taken to warm up a fuel cell is shorter than that for conventional ones.

DETAILED DESCRIPTION OF THE INVENTION

Figure 1:
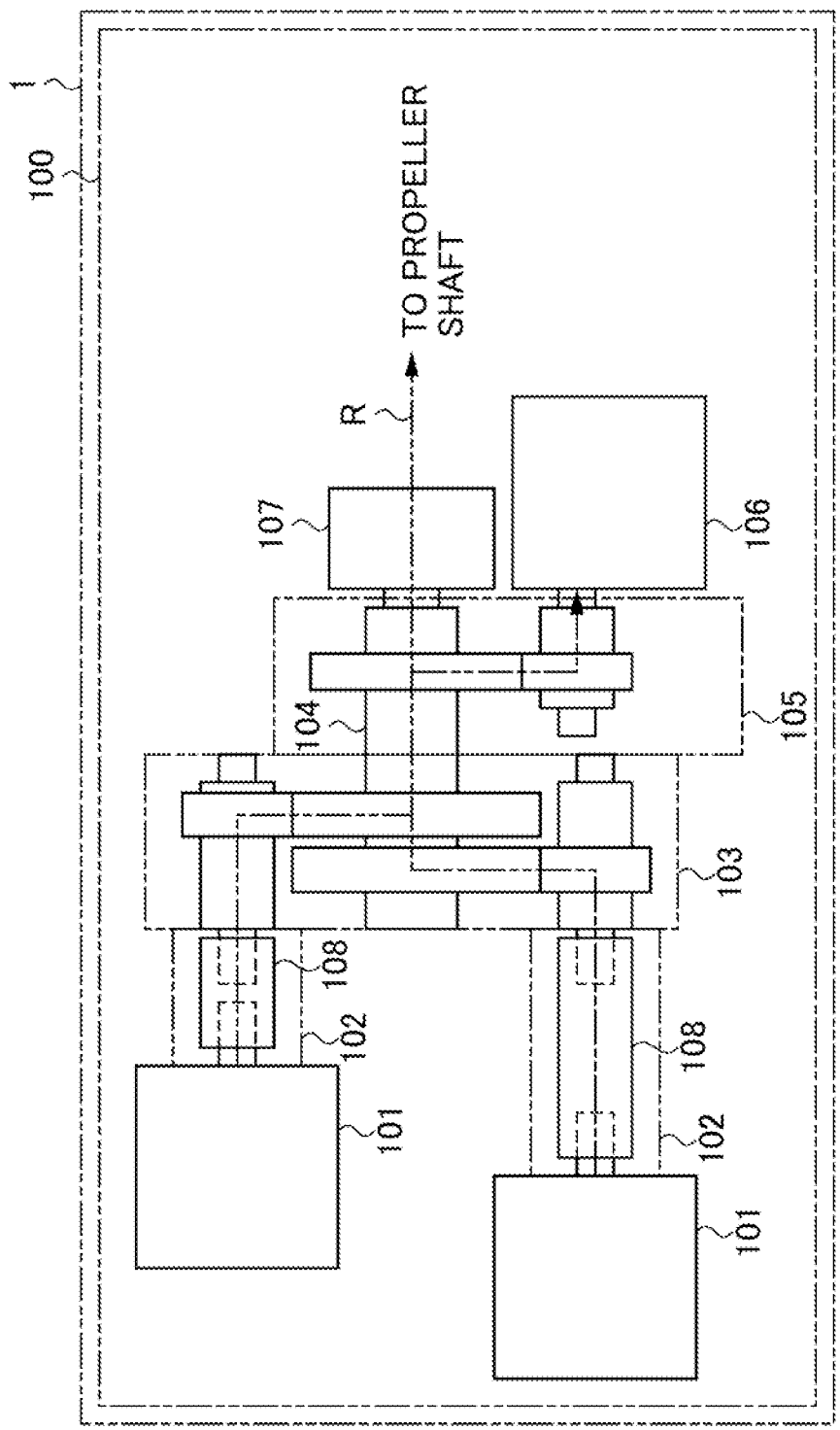
FIG. 1 is a view illustrating an example of a configuration of a driving unit included in a motor vehicle according to an embodiment.

A motor vehicle according to an embodiment will now be described herein with reference to the accompanying drawings. Note that, in the drawings used to describe below the embodiment, there may be cases where the scale of each component is appropriately changed. Furthermore, in the drawings used to describe below the embodiment, some configurations may be omitted for the purpose of description. Furthermore, in the drawings and the specification, identical reference numerals represent similar or identical elements.

FIG. 1 is a view illustrating an example of a configuration of a driving unit 100 included in a motor vehicle 1 according to the embodiment. The motor vehicle 1 represents a motor vehicle equipped with fuel cells, such as a fuel cell vehicle (FCV). The motor vehicle 1 uses, for example, the fuel cells as a driving power source to rotate wheels for traveling (propelling). The motor vehicle 1 includes the driving unit 100. The motor vehicle 1 represents an example of a warming-up system. The driving unit 100 includes, as an example, motors 101, adapters 102, a gear case 103, a rotation shaft 104, a gear case 105, a retarder (RET) 106, and a clutch 107. The driving unit 100 is configured to transmit motion energy (a rotative force) that the motors 101 output to each component. Furthermore, FIG. 1 illustrates a route R. The route R represents a route in which the rotative force is transmitted.

The motors 101 represent electric motors each configured to convert inputted electrical power into a rotative force and to output the rotative force. The adapters 102 are configured to couple the motors 101 and the gear case 103 to each other. The adapters 102 each include, as an example, a coupling shaft 108. The coupling shafts 108 respectively transmit the rotative forces that the motors 101 output to the gear case 103. Note that FIG. 1 illustrates the motor vehicle 1 including two pairs of the motors 101 and the adapters 102. However, as for the pairs, the motor vehicle 1 may include one pair or three or more pairs.

The gear case 103 is configured to use a plurality of gears and other components to transmit the rotative forces transmitted from the adapters 102 to the rotation shaft 104 to rotate the rotation shaft 104.

As the rotation shaft 104 rotates, the rotation shaft 104 transmits the rotative force transmitted from the gear case 103 to the gear case 105, the clutch 107, and other components.

The gear case 105 transmits the rotative force transmitted from the rotation shaft 104 to the retarder 106.

In a state where the retarder 106 is turned on, the retarder 106 is coupled to the rotation shaft 104 via the gear case 105. Therefore, the retarder 106 brakes the rotative force of the rotation shaft 104. As the retarder 106 brakes the rotative force of the rotation shaft 104, it is possible to reduce the rotating speed of the rotation shaft 104. Furthermore, with the retarder 106, it is therefore possible to decelerate the motor vehicle 1. While the retarder 106 is braking the rotative force of the rotation shaft 104, the retarder 106 generates heat. In a state where the retarder 106 is turned off, the retarder 106 does not brake the rotative force of the rotation shaft 104. Note that the retarder 106 represents an example of a speed reducer.

By switching the clutch 107 between an engaged state (on) and a disengaged state (off), switching of the rotative force takes place between transmission and disconnection. In a state where the clutch 107 is turned on, the clutch 107 transmits the rotative force transmitted from the gear case 103 to a propeller shaft and other components. Furthermore, in a state where the clutch 107 is turned off, the clutch 107 does not transmit (the clutch 107 disconnects) the rotative force transmitted from the gear case 103 to the propeller shaft and other components. The rotative force transmitted to the propeller shaft is transmitted to the wheels via, for example, a differential gear, drive shafts, and other components.

Figure 2:
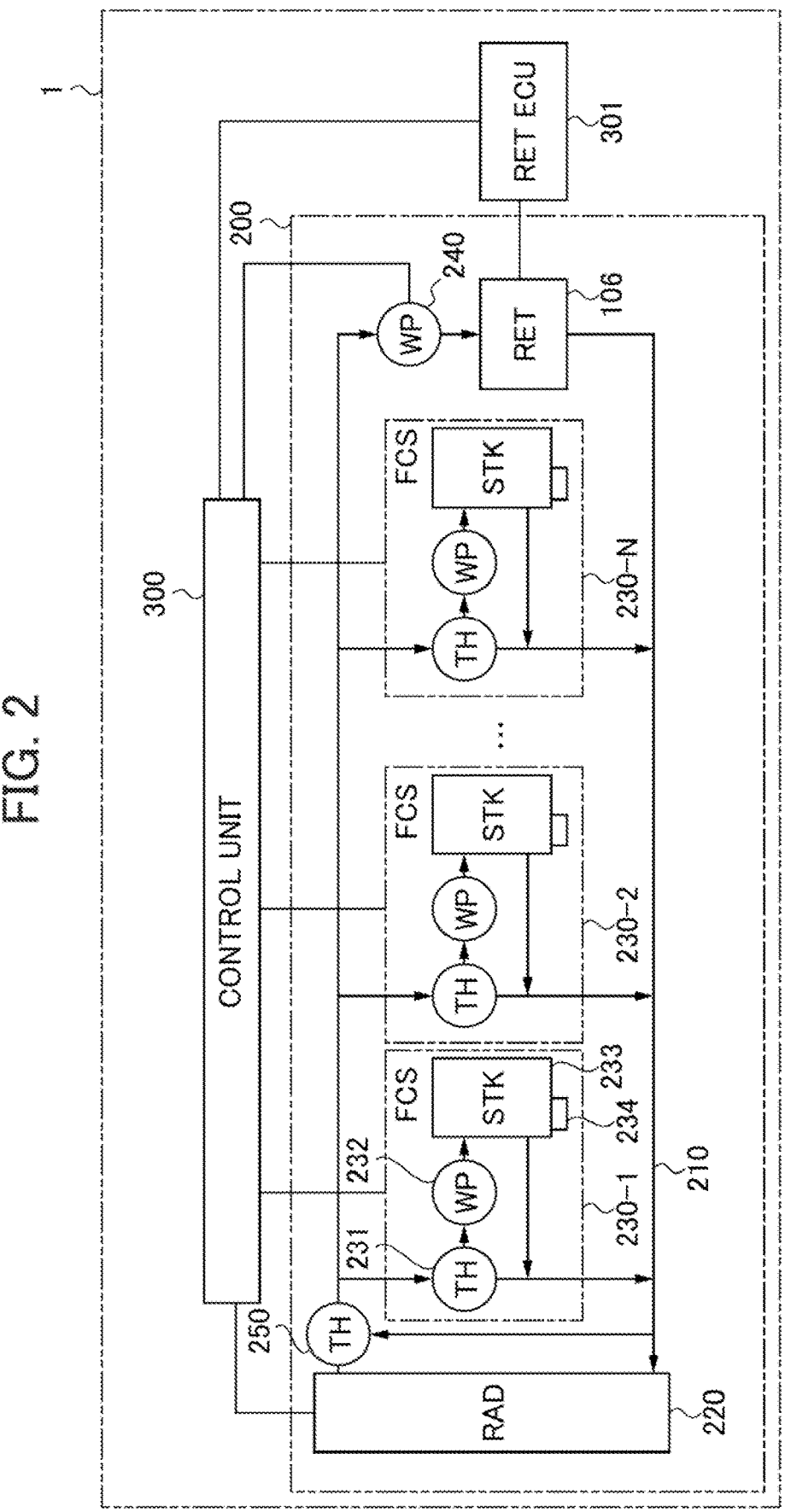
FIG. 2 is a block diagram illustrating an example of a configuration of a cooling unit and other components included in the motor vehicle according to the embodiment.

FIG. 2 is a block diagram illustrating an example of a configuration of a cooling unit 200 and other components included in the motor vehicle 1 according to the embodiment. The motor vehicle 1 includes, as an example, the cooling unit 200, a control unit 300, and a retarder electronic control unit (ECU) 301. The cooling unit 200 is configured to cool or warm up the fuel cells. The cooling unit 200 includes, as an example, a cooling circuit 210, a radiator 220, a fuel cell system (FCS) 230, a water pump (WP) 240, a thermostat valve (TH) 250, and the retarder 106.

The cooling circuit 210 represents, for example, a fluid circuit in which liquid such as coolant circulates and flows. As the coolant transfers heat, the cooling circuit 210 cools or warms up the fuel cells. After the coolant exits the radiator 220, the coolant passes through the FCS 230 or the water pump 240 and the retarder 106 and enters the radiator 220.

Through dissipation of heat, the radiator 220 cools the entered coolant.

As for the FCS 230, the cooling unit 200 includes one FCS 230 or a plurality of FCSs 230. FIG. 2 illustrates, as an example, the N number of the FCSs 230, i.e., FCS 230-1 to FCS 230-N. Note that N represents an integer of 1 or greater. The FCS 230 includes, as an example, a thermostat valve (TH) 231, a water pump 232, a fuel cell stack (STK) 233, and a temperature sensor 234.

The thermostat valve 231 is configured to control the flow of the coolant in the FCS 230 to allow the coolant to exit the fuel cell stack 233 or the FCS 230.

The water pump 232 is configured to increase a flow speed of the coolant flowing from the thermostat valve 231 to the fuel cell stack 233.

For the FCS 230, the thermostat valve 231 and the water pump 232 are caused to allow the coolant to reflux in the FCS 230.

In the fuel cell stack 233, a plurality of fuel cells are stacked with each other. The fuel cell stack 233 is configured to generate electrical power through electrochemical reactions of fuel gas and oxidant gas, for example, and to output the electrical power. The motors 101 are driven with the electrical power generated by the fuel cell stack 233. A battery is otherwise charged with the electrical power. The motors 101 are driven with electrical power that at least any of the fuel cell stack 233 and the battery outputs.

The temperature sensor 234 is configured to measure a temperature of the fuel cell stack 233. The temperature sensor 234 then outputs a measurement result of the temperature. The temperature sensor 234 represents an example of a measuring unit.

Furthermore, the FCS 230 may include, for example, an auxiliary device configured to consume electrical power to supply fuel gas and oxidant gas to the fuel cell stack 233.

The water pump 240 is configured to increase the flow speed of the coolant flowing into the retarder 106.

The thermostat valve 250 is configured to control the flow of the coolant in the cooling circuit 210 to allow the coolant to flow into any route of a route in which the coolant flows into the radiator 220 and a bypass line in which the coolant does not flow into the radiator 220. The bypass line represents, for example, a route in which the coolant flows from positions behind outlets for the coolant from the FCS 230 and the retarder 106, respectively, and in front of an inlet into the radiator 220 to positions behind an outlet from the radiator 220 and in front of inlets for the coolant into the FCS 230 and the retarder 106, respectively. As the coolant flows in such a route, the radiator 220 does not cool the coolant, facilitating warming up. Furthermore, heat generated in the retarder 106 is efficiently transferred to the FCS 230.

The control unit 300 represents, for example, a computer configured to control each component in the motor vehicle 1, such as the driving unit 100, the cooling unit 200, and the retarder ECU 301, and configured to perform various processing and calculations. Furthermore, the control unit 300 is configured to store, for example, programs with which the control unit 300 operates.

The retarder ECU 301 is configured to control the retarder 106.

Figure 3:
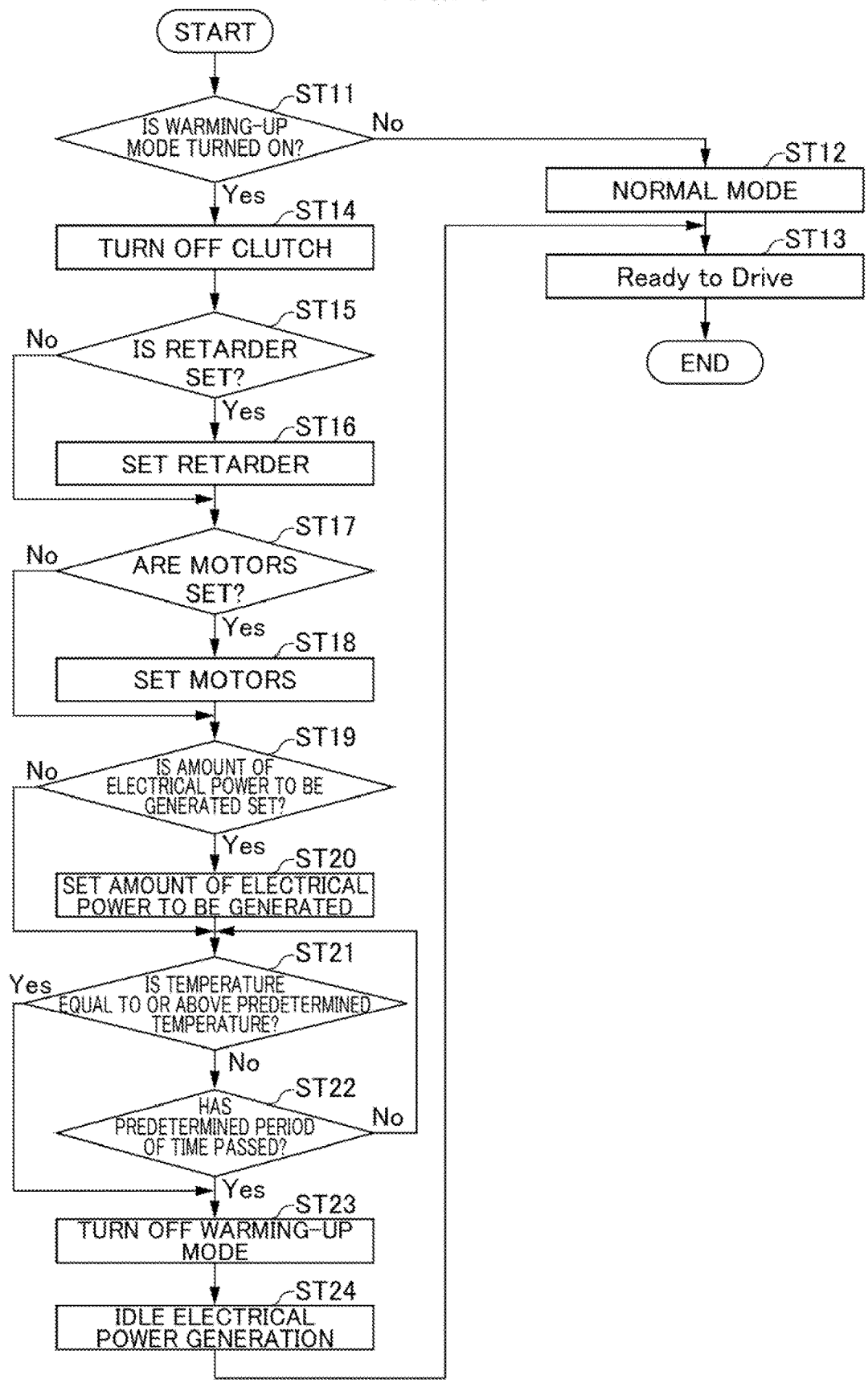
FIG. 3 is a flowchart illustrating an example of processing performed by a control unit illustrated in FIG. 2.
Figure 4:
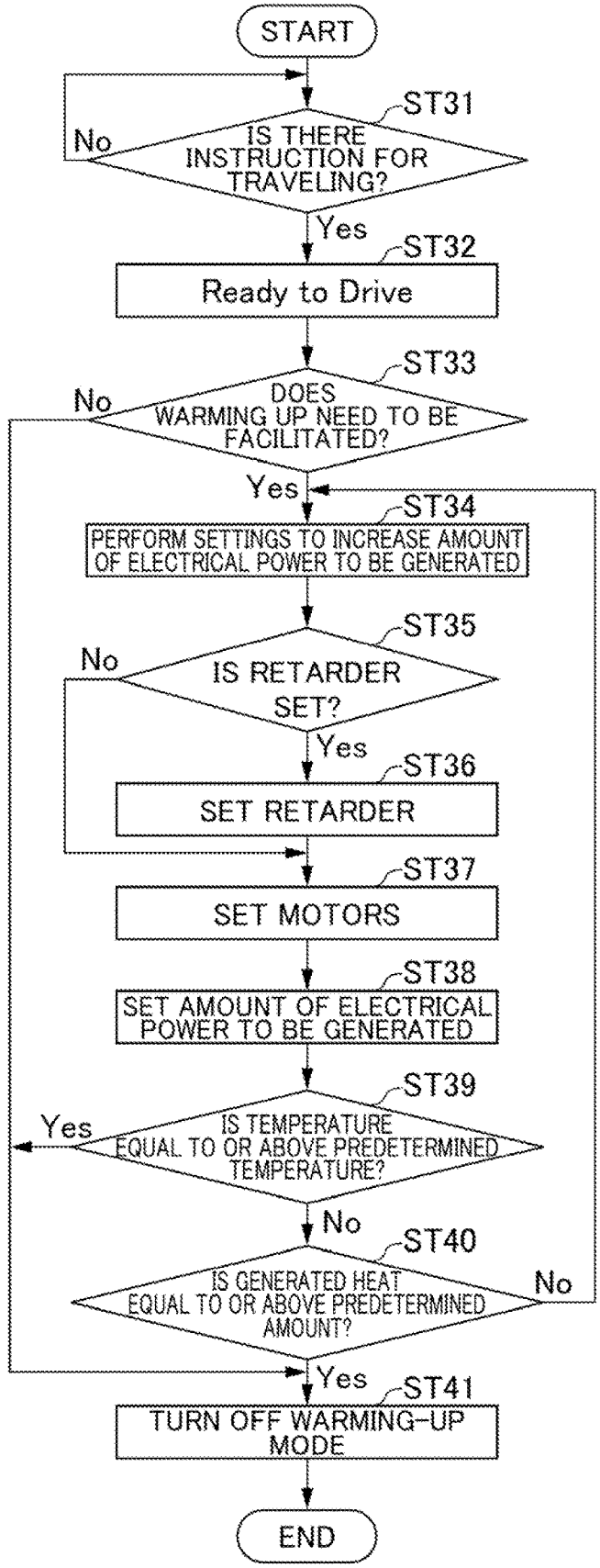
FIG. 4 is a flowchart illustrating an example of processing performed by the control unit illustrated in FIG. 2.
Figure 5:
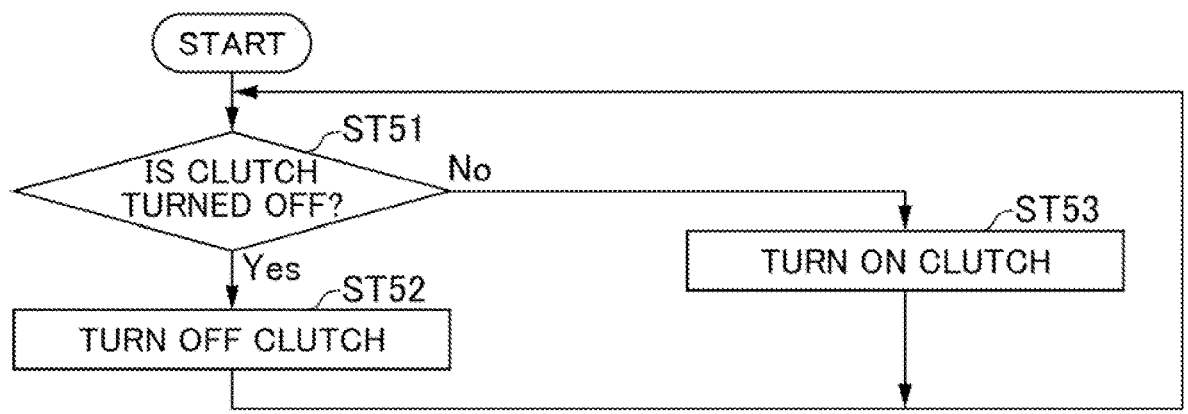
FIG. 5 is a flowchart illustrating an example of processing performed by the control unit illustrated in FIG. 2.

How the motor vehicle 1 according to the embodiment operates will now be described herein with reference to FIGS. 3 to 5, for example. Note that the content of the processing in the below operational description is a mere example. It is possible to appropriately utilize various types of processing that makes it possible to acquire similar results. FIGS. 3 to 5 are flowcharts illustrating examples of processing performed by the control unit 300. The control unit 300 executes, for example, the processing illustrated in FIGS. 3 and 4 based on the programs stored in the control unit 300 or another storage device.

The control unit 300 starts the processing illustrated in FIGS. 3 and 4 as the ignition is turned on, for example. Note that the control unit 300 carries out concurrently or in parallel the processing illustrated in FIGS. 3 and 4.

At step ST11 illustrated in FIG. 3, the control unit 300 determines whether to turn on a warming-up mode. When a temperature of the fuel cell stack 233 is equal to or below a predetermined threshold value TH1, for example, the control unit 300 determines to turn on the warming-up mode. The warming-up mode represents a mode under which the temperature of the fuel cell stack 233 is raised to a temperature appropriate for allowing the fuel cell stack 233 to operate. Note that the control unit 300 acquires the temperature of the fuel cell stack 233 from the temperature sensor 234, for example. When the control unit 300 has not determined to turn on the warming-up mode, the control unit 300 determines No at step ST11, and proceeds to step ST12.

At step ST12, the control unit 300 performs processing for starting the motor vehicle 1 with a normal mode.

At step ST13, the control unit 300 turns the motor vehicle 1 into a state where the motor vehicle 1 is able to run. Furthermore, the control unit 300 ends the processing illustrated in FIG. 4. After step ST13 in the processing, the control unit 300 ends the processing illustrated in FIG. 3.

On the other hand, when the control unit 300 has determined to turn on the warming-up mode, the control unit 300 determines Yes at step ST11, and proceeds to step ST14.

At step ST14, the control unit 300 performs control to turn off the clutch 107.

At step ST15, the control unit 300 determines whether to set torque of the retarder 106, based on the temperature of the fuel cell stack 233, for example. When the control unit 300 has determined to set torque of the retarder 106, for example, the control unit 300 determines Yes at step ST15, and proceeds to step ST16.

At step ST16, the control unit 300 turns on or off the retarder 106, based on the temperature of the fuel cell stack 233, for example. Furthermore, when the control unit 300 has determined to turn on the retarder 106, the control unit 300 determines a magnitude of torque of the retarder 106, based on at least any of the temperature of the fuel cell stack 233 and a desired amount of heat to be generated, for example. The control unit 300 then sets torque of the retarder 106 to the determined magnitude. Note that, in the retarder 106, the larger the torque, the larger the braking force. Note that a desired amount of heat to be generated refers to, for example, a desired magnitude such as an amount of heat to be transferred to the cooling circuit 210, a total amount of heat to be generated in the fuel cell stack 233 and the retarder 106, or an amount of heat that the fuel cell stack 233 acquires.

After step ST16 in the processing, the control unit 300 proceeds to step ST17. Furthermore, when the control unit 300 has determined to not set torque of the retarder 106, for example, the control unit 300 determines No at step ST15, and proceeds to step ST17. At step ST17, the control unit 300 determines whether to set rotating speeds and torques of the motors 101, based on at least any of the temperature of the fuel cell stack 233 and the desired amount of heat to be generated, for example. When the control unit 300 has determined to set rotating speeds and torques of the motors 101, for example, the control unit 300 determines Yes at step ST17, and proceeds to step ST18.

At step ST18, the control unit 300 determines magnitudes of the rotating speeds and torques of the motors 101, based on at least any of the temperature of the fuel cell stack 233, the desired amount of heat to be generated, and the set magnitude of torque of the retarder 106, for example. The control unit 300 then sets values of rotating speeds and torques of the motors 101 to the determined magnitudes.

After step ST18 in the processing, the control unit 300 proceeds to step ST19. Furthermore, when the control unit 300 has determined to not set rotating speeds and torques of the motors 101, for example, the control unit 300 determines No at step ST17, and proceeds to step ST19. At step ST19, the control unit 300 determines whether to set an amount of electrical power to be generated in the fuel cell stack 233, based on at least any of the temperature of the fuel cell stack 233, the desired amount of heat to be generated, and a necessary amount of electrical power, for example. A necessary amount of electrical power is based on electrical power necessary for propelling the motor vehicle 1 and electrical power necessary for warming up the fuel cell stack 233, for example. When the control unit 300 has determined to set an amount of electrical power to be generated in the fuel cell stack 233, the control unit 300 determines Yes at step ST19, and proceeds to step ST20.

At step ST20, the control unit 300 determines an amount of electrical power to be generated in the fuel cell stack 233, based on the temperature of the fuel cell stack 233, the desired amount of heat to be generated, the set rotating speeds and torques of the motors 101, and a necessary amount of electrical power, for example. The control unit 300 then sets an amount of electrical power to be generated in the fuel cell stack 233 to the determined magnitude. With the settings, the fuel cell stack 233 starts generation of electrical power, and outputs the generated electrical power at the amount. However, the control unit 300 causes the fuel cell stack 233 to generate electrical power when the temperature of the fuel cell stack 233 is equal to or above a predetermined temperature at which the fuel cell stack 233 is allowed to start generation of electrical power. Furthermore, the motors 101 rotate at the rotating speeds and torques, the magnitudes of which have been set at step ST18. With heat generated in the fuel cell stack 233 itself and heat that is generated in the retarder 106 and is transferred to the fuel cell stack 233 via the coolant, the fuel cell stack 233 is warmed up.

After step ST20 in the processing, the control unit 300 proceeds to step ST21. Furthermore, when the control unit 300 has determined to not set an amount of electrical power to be generated in the fuel cell stack 233, the control unit 300 determines No at step ST19, and proceeds to step ST21.

At step ST21, the control unit 300 determines whether the temperature of the fuel cell stack 233 is equal to or above a predetermined threshold value TH2. When the temperature of the fuel cell stack 233 is below the predetermined threshold value TH2, the control unit 300 determines No at step ST21, and proceeds to step ST22. Note that the threshold value TH2 represents an example of a first predetermined temperature.

At step ST22, the control unit 300 determines whether an elapsed period of time after the control unit 300 has turned on the warming-up mode is equal to or above a predetermined threshold value TH3. Note that a timing at which the warming-up mode is turned on corresponds to a point of time when step ST20 in the processing is performed, for example. When the elapsed period of time after the control unit 300 has turned on the warming-up mode is below the predetermined threshold value TH3, the control unit 300 determines No at step ST22, and returns to step ST21. As described above, the control unit 300 turns into a stand-by state where step ST21 and step ST22 are repeated until the temperature of the fuel cell stack 233 is equal to or above the predetermined threshold value TH2 or an elapsed period of time after the control unit 300 has turned on the warming-up mode is equal to or above the predetermined threshold value TH3.

When the temperature of the fuel cell stack 233 is equal to or above the predetermined threshold value TH2 while the control unit 300 is in the stand-by state where step ST21 and step ST22 are repeated, the control unit 300 determines Yes at step ST21, and proceeds to step ST23. Furthermore, when the elapsed period of time after the control unit 300 has turned on the warming-up mode while the control unit 300 is in the stand-by state where step ST21 and step ST22 are repeated is equal to or above the predetermined threshold value TH3, the control unit 300 determines Yes at step ST22, and proceeds to step ST23.

At step ST23, the control unit 300 turns off the warming-up mode. That is, the control unit 300 turns off the retarder 106 if the retarder 106 is on. Furthermore, the control unit 300 stops the motors 101 from rotating.

At step ST24, the control unit 300 sets an amount of electrical power to be generated in the fuel cell stack 233 to an amount of electrical power to be generated, which is necessary for causing the motor vehicle 1 to operate in an idle state (a non-travel state). Furthermore, the control unit 300 sets, if necessary, an amount of electrical power to be generated in the fuel cell stack 233 to a magnitude necessary for charging the battery. After step ST24 in the processing, the control unit 300 proceeds to step ST13.

On the other hand, the control unit 300 waits for an instruction for traveling at step ST31 illustrated in FIG. 4. For example, when the shift lever is placed at a position other than the parking position, the control unit 300 determines that the control unit 300 has received an instruction for traveling. As the control unit 300 determines that the control unit 300 has received an instruction for traveling, the control unit 300 determines Yes at step ST31, and proceeds to step ST32.

At step ST32, the control unit 300 ends the processing illustrated in FIG. 3. The control unit 300 then turns the motor vehicle 1 into a state under which the motor vehicle 1 is able to run. Furthermore, the control unit 300 starts the processing illustrated in FIG. 5. The control unit 300 carries out concurrently or in parallel the processing illustrated in FIG. 4 and the processing illustrated in FIG. 5.

At step ST51 illustrated in FIG. 5, the control unit 300 determines whether to turn off the clutch 107. As an example, when a speed of the motor vehicle 1 is equal to or below 3 km/h or when brake is on, the control unit 300 determines to turn off the clutch 107. As an example, when the speed of the motor vehicle 1 is above 3 km/h or when acceleration is on, the control unit 300 determines to turn on the clutch 107. When the control unit 300 determines to turn off the clutch 107, the control unit 300 determines Yes at step ST51, and proceeds to step ST52.

At step ST52, the control unit 300 performs control to turn off the clutch 107. After step ST52 in the processing, the control unit 300 returns to step ST51.

On the other hand, when the control unit 300 determines to turn on the clutch 107, the control unit 300 determines No at step ST51, and proceeds to step ST53. At step ST53, the control unit 300 performs control to turn on the clutch 107. After step ST53 in the processing, the control unit 300 returns to step ST51.

At step ST33 illustrated in FIG. 4, the control unit 300 determines whether to facilitate warming up for the fuel cell stack 233, based on the temperature of the fuel cell stack 233, for example. When the control unit 300 has determined to facilitate warming up for the fuel cell stack 233, the control unit 300 determines Yes at step ST33, and proceeds to step ST34.

At step ST34, the control unit 300 performs settings to increase an amount of electrical power to be generated in the fuel cell stack 233 to facilitate warming up by increasing the amount of heat to be generated in the fuel cell stack 233.

At step ST35, the control unit 300 determines whether to set torque of the retarder 106, based on at least any of the temperature of the fuel cell stack 233, the desired amount of heat to be generated, and the amount of electrical power to be generated, which has been set at step ST34, for example. When the control unit 300 has determined to set torque of the retarder 106, for example, the control unit 300 determines Yes at step ST35, and proceeds to step ST36.

At step ST36, the control unit 300 determines a magnitude of torque of the retarder 106, based on at least any of the temperature of the fuel cell stack 233, the desired amount of heat to be generated, and the amount of electrical power to be generated, which has been set at step ST34, for example. The control unit 300 then sets torque of the retarder 106 to the determined magnitude.

After step ST36 in the processing, the control unit 300 proceeds to step ST37. Furthermore, when the control unit 300 has determined to not set torque of the retarder 106, for example, the control unit 300 determines No at step ST35, and proceeds to step ST37. At step ST37, the control unit 300 determines magnitudes of rotating speeds and torques of the motors 101, based on a state of the motor vehicle 1, such as whether the clutch 107 is turned on or off, acceleration is on or off, a magnitude of acceleration, and a speed and a gear ratio of the motor vehicle 1, and based on the torque of the retarder 106, which has been set at step ST36. The control unit 300 then sets values of rotating speeds and torques of the motors 101 to the determined magnitudes.

At step ST38, the control unit 300 determines an amount of electrical power to be generated in the fuel cell stack 233, based on electrical power necessary for the motor vehicle 1 to run, the amount of electrical power to be generated, which has been set at step ST34, and electrical power used for other than traveling. Furthermore, when the control unit 300 has determined, at step ST34, to perform settings to increase an amount of electrical power to be generated, the control unit 300 determines an amount of electrical power to be generated to allow the amount of electrical power to be generated in the fuel cell stack 233 to be greater than an amount of electrical power to be generated in the fuel cell stack 233 when the control unit 300 determines to not perform settings to increase an amount of electrical power to be generated. The control unit 300 then sets an amount of electrical power to be generated in the fuel cell stack 233 to the determined magnitude. With the settings, the fuel cell stack 233 starts generation of electrical power, and outputs the generated electrical power at the amount. Furthermore, the motors 101 rotate at the rotating speeds and torques, the magnitudes of which have been set at step ST37. With heat generated in the fuel cell stack 233 itself and heat that is generated in the retarder 106 and is transferred to the fuel cell stack 233 via the coolant, the fuel cell stack 233 is warmed up.

At step ST39, the control unit 300 determines whether the temperature of the fuel cell stack 233 is equal to or above the predetermined threshold value TH2. When the temperature of the fuel cell stack 233 is below the predetermined threshold value TH2, the control unit 300 determines No at step ST39, and proceeds to step ST40. Note that the threshold value TH2 may be a value determined based on an elapsed period of time after the fuel cell stack 233 has started generation of electrical power. In this case, the control unit 300 determines a value of the threshold value TH2.

At step ST40, the control unit 300 determines whether a total of an amount of heat generated in the fuel cell stack 233 and an amount of heat generated in the retarder 106 is equal to or above a predetermined threshold value TH4 or an amount of heat generated in the fuel cell stack 233 is equal to or above a predetermined threshold value TH5. When the total of the amount of heat generated in the fuel cell stack 233 and the amount of heat generated in the retarder 106 is below the predetermined threshold value TH4 and the amount of heat generated in the fuel cell stack 233 is below the predetermined threshold value TH5, the control unit 300 determines No at step ST40, and returns to step ST34.

When the control unit 300 has determined to not facilitate warming up for the fuel cell stack 233, the control unit 300 determines No at step ST33, and proceeds to step ST41. Furthermore, when the temperature of the fuel cell stack 233 is equal to or above the predetermined threshold value TH2, the control unit 300 determines Yes at step ST39, and proceeds to step ST41. Furthermore, when the total of the amount of heat generated in the fuel cell stack 233 and the amount of heat generated in the retarder 106 is equal to or above the predetermined threshold value TH4 or the amount of heat generated in the fuel cell stack 233 is equal to or above the predetermined threshold value TH5, the control unit 300 determines Yes at step ST40, and proceeds to step ST41.

At step ST41, the control unit 300 turns off the warming-up mode. That is, when the retarder 106 has been turned on, the control unit 300 turns off the retarder 106. After step ST41 in the processing, the control unit 300 ends the processing illustrated in FIG. 4, and causes the fuel cell stack 233 to shift to an idle electrical power generation mode or another mode.

The motor vehicle 1 according to the embodiment includes the bypass line and the thermostat valve 250, making it possible to transfer heat generated in the retarder 106 to the fuel cell stack 233 via the coolant. Therefore, with the motor vehicle 1 according to the embodiment, it is possible to shorten a period of time taken to warm up the fuel cell stack 233.

The cooling unit 200 includes the thermostat valve 231 and the water pump 232 per the FCS 230, making it possible to allow the coolant to reflux separately in the FCS 230. Therefore, with the motor vehicle 1, it is possible to increase a speed for warming up the fuel cell stack 233.

Furthermore, in the motor vehicle 1 according to the embodiment, torque of the retarder 106 is determined based on at least any of the temperature of the fuel cell stack 233 and a desired amount of heat to be generated. Therefore, with the motor vehicle 1 according to the embodiment, it is possible to set an amount at which a load of the retarder 106 is to be increased and an amount of heat to be generated to appropriate magnitudes in accordance with the temperature of the fuel cell stack 233.

Furthermore, with the motor vehicle 1 according to the embodiment, rotating speeds and torques of the motors 101 are determined based on the temperature of the fuel cell stack 233. Therefore, with the motor vehicle 1 according to the embodiment, it is possible to set an amount at which a load of the retarder 106 is to be increased and an amount of heat to be generated to appropriate magnitudes in accordance with the temperature of the fuel cell stack 233.

Furthermore, in the motor vehicle 1 according to the embodiment, when at least any of the temperature of the fuel cell stack 233 and a desired amount of heat to be generated is equal to or above the predetermined threshold value TH2 or when an elapsed period of time after warming up has been started is equal to or above the predetermined threshold value TH3, the warming up ends. By doing so as described above, in the motor vehicle 1 according to the embodiment, it is possible to prevent the fuel cell stack 233 from being warmed up excessively.

Furthermore, in the motor vehicle 1 according to the embodiment, when there is an instruction for traveling, an amount of electrical power to be generated in the fuel cell stack 233 is set to an amount of electrical power to be generated in accordance with electrical power necessary for traveling and electrical power necessary for facilitating warming up. Therefore, with the motor vehicle 1 according to the embodiment, traveling is possible even during warming up.

It is possible to modify the embodiment described above as described below. The control unit 300 may control the thermostat valve 231 and the water pump 232 per the FCS 230 to warm up some of the fuel cell stacks 233 in a prioritized manner. In this case, the control unit 300 controls, for the FCS 230 including the fuel cell stack 233 that is to be warmed up in a prioritized manner, the thermostat valve 231 and the water pump 232 to allow the coolant to reflux in the FCS 230.

Among the fuel cell stacks 233 included in the motor vehicle 1, for example, the control unit 300 warms up the M number of the fuel cell stacks 233 each having a lower degree of deterioration in a prioritized manner. Note that M is an integer below N. The control unit 300 warms up the rest of the fuel cell stacks 233 in a prioritized manner when the temperatures of the fuel cell stacks 233 that have been warmed up in a prioritized manner have risen fully, i.e., are equal to or above the threshold value TH2, for example. When the fuel cell stacks 233 that have been warmed up in a prioritized manner are fully warmed up to a temperature that is equal to or above a predetermined temperature at which generation of electrical power is allowed to start, the control unit 300 then causes the fuel cell stacks 233 to start generation of electrical power. For warming up the rest of the fuel cell stacks 233, it is possible to use heat of the fuel cell stacks 233, the temperatures of which are already equal to or above the threshold value TH2, making it possible to perform prompt warming up. Since the lower the degree of deterioration, the easier the fuel cell stacks 233 output generated electrical power, doing so as described above makes it possible to increase a speed for warming up. Note that the control unit 300 regards the fuel cell stacks 233 in such a manner that the shorter the period of operation time, the lower the degree of deterioration, for example. Note that the predetermined temperature at which generation of electrical power is allowed to start represents an example of a second predetermined temperature.

The control unit 300 may otherwise warm up the fuel cell stacks 233 with a lower temperature in a prioritized manner, for example. Therefore, the control unit 300 makes it possible to allow temperatures of a plurality of the fuel cell stacks 233 to evenly rise.

The above embodiment has been described with reference to a motor vehicle as an example. However, it is possible to apply the warming-up system according to the embodiment to those other than motor vehicles, such as those vehicles or unattended machines that use fuel cells as a driving power source. For example, it is possible to apply the warming-up system according to the embodiment to airplanes, ships and vessels, submarines, or railroad vehicles that use fuel cells as a driving power source, for example.

The control unit 300 may be one where a part or a whole of the processing achieved by the programs in the embodiment described above is achieved by a circuit hardware configuration.

The programs that achieve the processing according to the embodiment are transferred in a state where the programs are stored in a device, for example. However, the device may be transferred in a state where the programs are not stored. The programs may then be separately transferred, and written into the device. It is possible to achieve the transferring of the programs at this time in such a manner that the programs are recorded in a removable storage medium, or otherwise the programs are downloaded via a network such as the Internet or a local area network (LAN), for example.

Although the embodiment of the present invention has been described, the illustrated embodiment is a mere example and is not intended to limit the scope of the present invention. It is possible to implement the embodiment of the present invention in various aspects without departing from the gist of the present invention.

EXPLANATION OF REFERENCE NUMERALS

1 MOTOR VEHICLE
100 DRIVING UNIT
101 MOTOR
102 ADAPTER
103, 105 GEAR CASE
104 ROTATION SHAFT
106 RETARDER
107 CLUTCH
108 COUPLING SHAFT

200 COOLING UNIT
210 COOLING CIRCUIT
220 RADIATOR
230 FCS
231 THERMOSTAT VALVE
232, 240 WATER PUMP
233 FUEL CELL STACK
234 TEMPERATURE SENSOR
300 CONTROL UNIT
301 RETARDER ECU

What is claimed is:

1. A warming-up system comprising:
 a fuel cell configured to generate electrical power through electrochemical reactions;
 a motor configured to convert the electrical power generated by the fuel cell into a rotative force;
 a rotation shaft that rotates by the rotative force;
 a speed reducer configured to brake the rotation shaft that is rotating;
 a measuring unit configured to measure a temperature of the fuel cell; and
 a control unit configured to determine whether to perform warming up for the fuel cell, based on the temperature, the control unit causing, when the control unit determines to perform the warming up, the motor and the speed reducer to operate, and using heat generated in the fuel cell and heat generated in the speed reducer to warm up the fuel cell.

2. The warming-up system according to claim 1, wherein the control unit determines torque of the speed reducer, based on the temperature.

3. The warming-up system according to claim 1, wherein the control unit determines a rotating speed and torque of the motor, based on the temperature.

4. The warming-up system according to claim 1, wherein the control unit determines an amount of electrical power to be generated in the fuel cell, based on the temperature.

5. The warming-up system according to claim 1, wherein the control unit causes, when the temperature is equal to or above a first predetermined temperature or when an elapsed period of time after the warming up has been started is equal to or above a predetermined period of time, the motor and the speed reducer to stop operating to end the warming up.

6. The warming-up system according to claim 1, wherein the control unit changes, when the control unit receives an instruction for propelling during the warming up, an amount of electrical power to be generated in the fuel cell in accordance with electrical power required for propelling and warming up.

7. The warming-up system according to claim 1, wherein a plurality of the fuel cells are included, and
 the control unit prioritizes warming up for one of the fuel cells, the one of the fuel cells having a lower degree of deterioration.

8. The warming-up system according to claim 7, wherein the control unit causes, when the temperature of one of the fuel cells, which has been warmed up in a prioritized manner, is equal to or above a second predetermined temperature, the one of the fuel cells, which has been warmed up in a prioritized manner, to start generation of electrical power.

* * * * *